United States Patent
Yamada et al.

(10) Patent No.: US 8,028,156 B2
(45) Date of Patent: Sep. 27, 2011

(54) COMPUTER INITIALIZATION DATA GENERATION THAT ACCESSES TASK AND INITIALIZATION DATABASES BASED ON COMPUTER ID

(75) Inventors: Tsutomu Yamada, Hitachinaka (JP); Hisanori Nonaka, Tokai (JP); Tatsuya Maruyama, Hitachi (JP); Hiromichi Endoh, Hitachi (JP); Noritaka Matsumoto, Hitachi (JP); Hideaki Suzuki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 923 days.

(21) Appl. No.: 12/016,492

(22) Filed: Jan. 18, 2008

(65) Prior Publication Data

US 2008/0222405 A1    Sep. 11, 2008

(30) Foreign Application Priority Data

Mar. 5, 2007   (JP) .................. 2007-053859

(51) Int. Cl.
    *G06F 15/177*    (2006.01)
(52) U.S. Cl. .............. 713/2; 717/168; 717/174
(58) Field of Classification Search ...... 713/2; 717/168, 717/174
    See application file for complete search history.

(56) References Cited

U.S. PATENT DOCUMENTS 6,854,112 B2 * 2/2005 Crespo et al. .............. 717/174
7,694,291 B2 * 4/2010 Chen et al. ................. 717/162

FOREIGN PATENT DOCUMENTS

| JP | 6-51958 | 2/1994 |
| JP | 9-218777 | 8/1997 |
| JP | 3173361 | 3/2001 |

* cited by examiner

*Primary Examiner* — Albert Wang
(74) *Attorney, Agent, or Firm* — Antonelli, Terry, Stout & Kraus, LLP.

(57) ABSTRACT

An initialization data generator includes a task database in which task descriptions for initializing a computer are specified related with task IDs and an initialization database in which initialization data descriptions for initializing a computer are stored related with initialization data IDs. The initialization data generator takes input of the computer ID of a computer to be initialized and task data, reads task descriptions and initialization data descriptions according to task ordering related with the task data from the task database and the initialization database, based on the task IDs, task ordering, and the initialization data IDs for software modules which are loaded into the computer to be initialized by the tasks corresponding to the task IDs, specified in the task data, and generates and transfers initialization data to the computer to be initialized, thereby initializing the computer to be initialized.

9 Claims, 9 Drawing Sheets

FIG. 4

| TASK ORDERING | TASK ID | INITIALIZATION DATA ID |
|---|---|---|
| 1 | INIT-OS | 0x0012 |
| 2 | ERASE-APL | NULL |
| 3 | INIT-DRV | 0x0014 |

FIG. 5

| COMPUTER ID | TASK ORDERING | TASK ID | INITIALIZATION DATA ID |
|---|---|---|---|
| 0x0001 | 1 | INIT-OS | 0x0012 |
| 0x0001 | 2 | ERASE-APL | NULL |
| 0x0001 | 3 | INIT-DRV | 0x0014 |
| 0x0002 | 1 | NULL | NULL |

FIG. 6

| TASK ID | INTRA-TASK ORDERING | TASK DESCRIPTION | |
|---|---|---|---|
| INIT-OS | 1 | CLEAR OS AREA | 65 |
| INIT-OS | 2 | WRITE DATA INTO OS AREA | 66 |
| ERASE-APL | 1 | CLEAR APL AREA | 67 |
| INIT-DRV | 1 | CLEAR DRV AREA | 68 |
| INIT-DRV | 2 | WRITE DATA INTO DRV AREA | 69 |

FIG. 7

| INITIALIZATION DATA ID | IDENTIFIER | INITIALIZATION DATA DESCRIPTION | |
|---|---|---|---|
| 0x0012 | 1 | /data/kernel-1 | 75 |
| 0x0012 | 2 | /data/kernel-1-conf | 76 |
| 0x0014 | 3 | /data/etc/drv-1 | 77 |
| 0x0014 | 4 | /data/etc/drv-2 | 78 |
| 0x0014 | 5 | /data/etc/drv-3 | 79 |

- MEMORY SELECT SIGNAL = SETTING FOR ORDINARY OPERATION (CPU ADDRESS)

0x0000 0000 — ACCESS TO NONVOLATILE MEMORY 86
0x01FF FFFF

- MEMORY SELECT SIGNAL = SETTING FOR INITIALIZATION (CPU ADDRESS)

0x0000 0000 — ACCESS TO NONVOLATILE MEMORY 81
0x00FF FFFF
0x0100 0000 — ACCESS TO NONVOLATILE MEMORY 86
0x01FF FFFF

COMPUTER INITIALIZATION DATA GENERATION THAT ACCESSES TASK AND INITIALIZATION DATABASES BASED ON COMPUTER ID

CLAIM OF PRIORITY

The present application claims priority from Japanese application serial No. 2007-53859, filed on Mar. 5, 2007, the contents of which are hereby incorporated by reference into this application.

FIELD OF THE INVENTION

The present invention relates to a computer initialization system and, particularly, relates to a computer initialization system for generating initialization data for automatic initialization of a computer, appropriately according to computer and software configurations required by users.

BACKGROUND OF THE INVENTION

As methods for installing initialization-software into a computer to initialize the computer, for example, methods described in Japanese Patent No. 3173361 and Japanese Patent Application Laid-Open No. H6(1994)-51958 are known. Japanese Patent No. 3173361 discloses a technique for installing software into a computer automatically via a network. According to this, an installation server is provided with a means for automatically generating unique parameters such as computer names corresponding to a plurality of computers to be initialized, by using their respective network addresses. Thereby, it is possible to reduce task time for installing respective initialization-software programs into a plurality of computers connected to a system.

Meanwhile, Japanese Patent Application Laid-Open No. H6(1994)-51958 discloses an installation media creating device for creating installation media having respective contents conforming to different users. This installation media creating device comprises an installation software storage means in which software to be installed is stored, an input means for inputting user-dependent data, a software generating means for changing installation software by user-dependent data and generating user-dependent installation software, and a media creating means for creating installation media based on user-dependent installation software generated by the software generating means.

By the way, computers have diverse configurations according to functions and uses. Particularly, for embedded computers, their configurations are much diversified. For example, there even are many computers configured without an interface for network connection, a CD-ROM, or a hard disk. Further even as to software to be loaded into computers, it is required to provide catering to varieties of software, because some computers do not use universal basic software (Operating System; OS) and other computers use a sophisticated OS for network services. Therefore, there is a need for preparing different items of application software programs that are implemented, appropriately according to requirements of respective users of computers.

However, the methods for initializing computers, described in the above-mentioned prior arts and the like, have a problem in which an adequate consideration is not taken for catering to different configurations depending on functions and uses of computers required by users and differences of application software programs to be implemented.

Specifically, the installation server disclosed in Japanese Patent No. 3173361 acquires a parameter essential to installation for a machine into which software should be installed from a unique parameter information database. Therefore, a precondition is that a machine into which software should be installed and the installation server be connected by a network. Consequently, this method cannot apply to a computer without a network interface. If a parameter corresponding to a machine into which software should be installed does not exist in the unique parameter information database, a parameter essential to installation is determined by a prearranged rule. This rule has to be determined before hand and it is hard to satisfy a demand for an arbitrary combination of application software programs.

The installation media creating device disclosed in Japanese Patent Application Laid-Open No. H6(1994)-51958 changes installation software by user-dependent data that has been input from the user-dependent data input unit and generates and outputs user-dependent installation software. Here, the user-dependent data is information such as a computer environment, user environment, and software environment specific for an individual user corresponding to a user name. This leaves a problem of not meeting a demand of specifying a combination of application software programs to be installed optionally into an individual computer. In Japanese Patent Application Laid-Open No. H6(1994)-51958, no description is provided as to the configuration of the user-dependent input unit. Therefore, it is unclear how to register and refer to user-dependent data and it must be solved how to register a combination of application software programs optionally into an individual computer.

In general, products of embedded computers are available with diversified types, but inmost cases, the number of products manufactured per type is relatively small. Because of a reduction in the manufacturing cost per machine, the number of used parts is reduced as few as possible. For this reason, in most cases, such computers are not equipped with interfaces for basic software and installation media such as, for example, BIOS (Basic Input/Output System) ROM and CD-ROM, generally found in a personal computer (PC). Under such restrictions, there is a demand for a method that makes it possible to perform not only a software installation task in a manufacturing process up to a maintenance task after product shipment at less cost and infallibly.

The present invention is to provide a computer initialization system that can flexibly cater to differences among hardware configurations and software configurations of computers and is convenient.

SUMMARY OF THE INVENTION a computer initialization system according to the present invention is characterized by comprising: an initialization data generator including a task database in which task descriptions for initializing a computer are specified related with task IDs; and an initialization database in which initialization data descriptions for initializing the computer are stored related with initialization data IDs.

Further, the initialization data generator comprises: a data acquisition means which takes input of a computer ID for identifying the computer and task data for initialization of the computer, wherein the task data specifies the task IDs for identifying the task descriptions, task ordering for initialization task, and the initialization data IDs for identifying initialization data of initialization-software to be installed into the computer; and an initialization data generation means which reads the task descriptions and the initialization data descriptions from the task database and the initialization database according to the task ordering, by using the task IDs, the task ordering and the initialization data IDs, and generates the initialization data for initializing the computer according to the data descriptions.

That is, the initialization data generator includes the task database in which task descriptions for initializing a computer are specified related with the IDs (identification codes) of initialization tasks and the initialization database in which initialization data descriptions for initializing a computer are stored related with the IDs (identification codes) of initialization data for software. By inputting the computer ID of a computer to be initialized and task data in which the initialization data IDs for installation software modules, the task IDs, and task ordering are specified to the initialization data generator, it is possible to automatically initialize a computer having intended functions, flexibly catering differences among hardware configurations and software configurations among computers to be initialized and by convenient work. Thus, by only reading the computer ID identifying a computer and task data, initialization data appropriate for the computer ID can be generated. Generated initialization data can be transferred in a form allowing for initializing the computer to be initialized.

In this aspect, the initialization data generator may include an initialization data output means for transferring the initialization data generated by the initialization data generation means to the computer.

Further, a computer database may be provided in which the computer ID of the computer and the task data are related and stored. Also, the initialization data generator may lo include a relating means for relating the computer ID and the task data acquired by the target data acquisition means with each other to store them into the computer database.

Additionally, the initialization data output means may be configured to output the initialization data to an initialization media that is connectable to the computer.

Further, the computer initialization system may include a wireless tag in which the computer ID of the computer and the task data are described and an input device that reads the computer ID and the task data from the wireless tag and transmits them to the target data acquisition means.

In another aspect of the present invention, a computer initialization system may comprise: an ID input device for reading a computer ID for identifying a computer to be initialized and a task data for initialization of the computer. The task data specifies task IDs for identifying initialization-task descriptions, task ordering for initialization task, and initialization data IDs for identifying initialization data of initialization-software to be installed into the computer.

Further the system includes: a task database for specifying task descriptions for initializing the computer related with the task IDs; an initialization database for storing initialization data descriptions for initializing the computer related with the initialization data IDs; an initialization data generator which is connected to the input device via a communication means, reads the task descriptions and the initialization data descriptions from the task database and the initialization database according to the task ordering related with the task data, by using the computer ID and the task data which are input from the input device, and generates the initialization data for initializing the computer according to the data descriptions; and a media input device including an initialization media for connecting to the initialization data generator via a communication means to store the initialization data transferred from the initialization data generator, a memory for containing an initialization program for the computer, and a computer interface that, by request from the computer to be initialized, transfers the initialization program for reading the initialization data from the initialization media to the computer.

In this aspect, the initialization data generator may further include a tag data setting means that sets computer tag data, based on the contents of the computer database, the task database, and the initialization database. The computer tag data includes at least one of the following: parameters for software included in the initialization data, TCP port numbers for applications for setup, installation software version information, manufacturing date, and a manufacturing serial number. The initialization data generator may transfer and write the computer tag data to a computer tag provided in or attached to the computer to be initialized. In this way, setup data relevant to the computer to be initialized can be held in the computer tag and, when the computer to be initialized is put to maintenance, necessary information can be acquired without accessing the databases provided in an initialization data server, and maintainability is improved.

For use of the computer initialization system of the present invention, a simple arrangement needs to be added to the computer to be initialized. Specifically, there are need to provide a media input device interface connected to the computer interface of the media input device via a communication means and a selector means that allows an arithmetic processing means of the computer to be initialized to get access to the media input device need to be provided. When the selector means selects a path allowing access to the media input device, the arithmetic processing means reads and executes the initialization program residing in the media input device via the media input device interface and the computer interface. Thereby initialization data stored in the initialization media is written into a program memory of the computer, consequently completing initialization.

It is possible to automate an overall procedure of acquiring the computer ID from the computer to be initialized, generating initialization data related with the computer ID, and finally transferring the initialization data to the computer to be initialized, and thereby productivity can be improved.

As described above, according to the present invention, for embedded computers for which a variety of setup, application software, and combination thereof would be needed depending on required specifications, software installation and setup can be initialized without fail.

Further, in maintenance work after shipment of computers besides the manufacturing process, maintenance of installation software can be facilitated.

According to the present invention, it is possible to provide a computer initialization system that can flexibly cater to differences among hardware configurations and software configurations of computers and is convenient.

BRIEF DESCRIPTION OF THE DRAWINGS

FIG. 4 illustrates an example of a task data structure in a task sheet in the first embodiment.

FIG. 5 illustrates an example of a computer data structure in a computer DB in the first embodiment.

FIG. 6 illustrates an example of a task data structure in a task DB in the first embodiment.

FIG. 7 illustrates an example of an initialization data structure in an initialization DB in the first embodiment.

DETAILED DESCRIPTION OF THE PREFERRED EMBODIMENTS

In the following, preferred embodiments of the present invention will be explained.

First Embodiment

Figure 1:
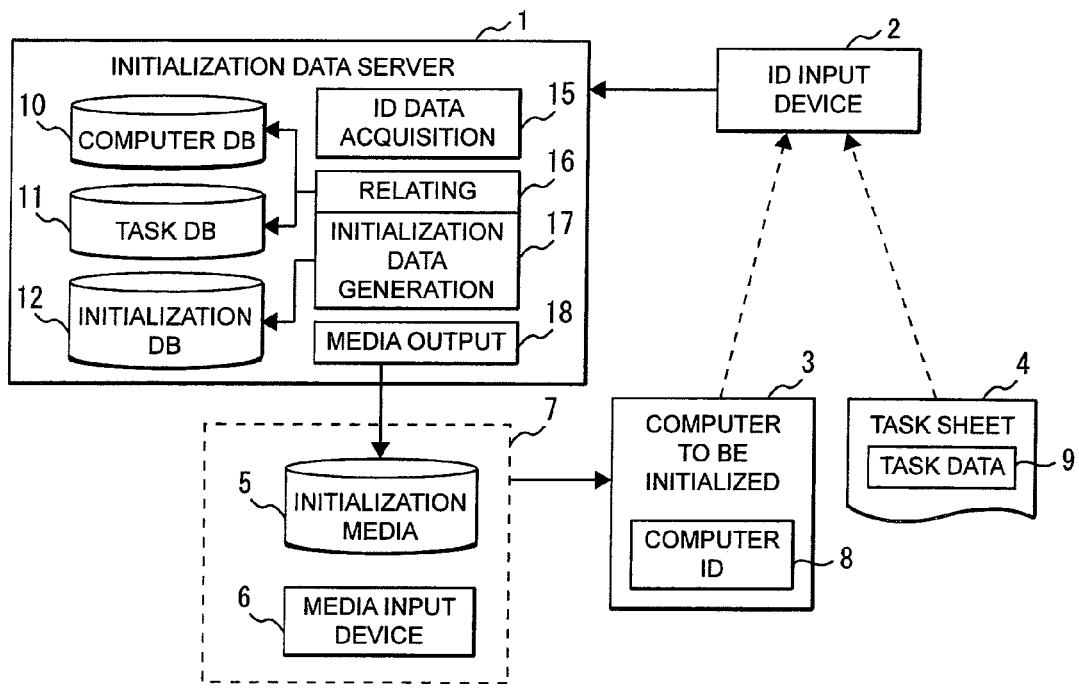
FIG. 1 is a block diagram representing a schematic framework of a computer initialization system of a first embodiment of the present invention.

A block diagram shown in FIG. 1 represents a schematic framework of a computer initialization system of a first embodiment of the present invention. As shown, the computer initialization system of the present embodiment comprises an initialization data server 1 corresponding to an initialization data generator, an ID input device 2, an initialization-target computer 3 to be initialized, a task sheet 4, an initialization media 5, a media input device 6, and an initialization data input means 7 comprised of the initialization media 5 and the media input device 6.

The initialization data server 1 is a computer which generates initialization data for initializing the computer 3. It comprises a computer database (DB) 10, a task database (DB) 11, an initialization database (DB) 12, an ID data acquisition means 15, a relating means 16, an initialization data generation means 17, and a media output means 18.

A computer ID 8 is set in the computer 3 to be initialized. The computer ID 8 is an identification code used to identify the computer 3. A unique code may be assigned to each computer 3 or a code that designates a type may be assigned to a plurality of computers 3 of the same type. For example, it is possible to use EPC (Electronic Product Code; TM) which is a product numbering scheme capable of providing unique identification across the globe.

In the task sheet 4, as is shown in FIG. 4, task data 9 necessary for initialization and the like of the computer 3 is described. The task data 9 includes initialization task ordering, task ID to identify a task description, and initialization data ID to identify initialization data relevant to a software to be installed by an initialization task corresponding to a task ID. Here, the software comes in a variety of programs such as application software programs, basic software programs for running applications, and setup files. The following description of the present embodiment assumes that the computer ID 8 and the task data 9 are, for example, stored in a wireless tag such as RFID (Radio Frequency Identification) and attached to the computer 3 to be initialized.

The ID input device 2 is linked to the computer 3 and the task sheet 4 via a data transmission means such as a wireless communication channel. Thus, the ID input device 2 is configured to have a function to acquire the computer ID 8 and the task data 9 through communication with, for example, the wireless tag attached to the computer 3. The ID input device 2 is also configured to have means for transmitting data acquired from the computer 3 or the task sheet 4 to the initialization data server 1.

The ID data acquisition means 15 is arranged to take in the computer ID 8 and the task data 9 transmitted from the ID input device 2 and transfer them to the relating means 16. The relating means 16 is arranged to relate the computer ID and the task data 9 and store them into the computer DB 10.

In the task DB 11, as is shown in FIG. 6, initialization task ordering and descriptions are stored in advance, related with task ID of the task data 9. In the initialization DB 12, as is shown in FIG. 7, initialization data descriptions for software are stored in advance, related with initialization ID of the task data 9. The initialization data generation means 17 is arranged to generate initialization data according to the descriptions stored in the initialization DB 12 and output the initialization data to the initialization media 5 via the media output means 18.

The initialization media 5 consists of a storage device or a communication channel for delivering initialization data generated by the initialization data server 1 to the computer 3. The media input device 6 is a device that mediates between the initialization media 5 and the computer to be initialized 3 and has a function to convert various types of memories and communication channels into a connection scheme suitable for the computer 3. A detailed configuration of the media input device 6 will be described later with reference to FIGS. 8A, 8B.

Here, although the ID input device 2, the computer 3 to be initialized, the task sheet 4, and the initialization media 5 are all single units as shown in FIG. 1, these may be plural ones, respectively. It is possible to relate a plurality of lo task sheets 4 to one computer to be initialized 3 or inversely relate one task sheet 4 to a plurality of computers to be initialized 3.

Figure 2:
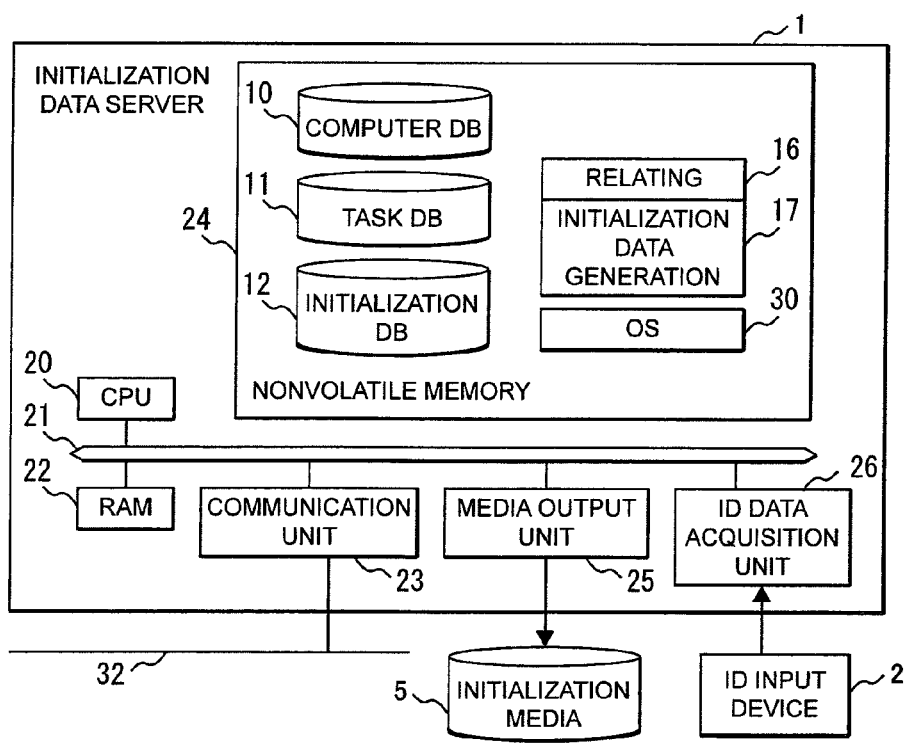
FIG. 2 is a block diagram showing an example of a configuration of an initialization data server.

A detailed configuration of the initialization data server 1 is shown in FIG. 2. As shown, the initialization data server 1 comprises elements such as a CPU 20, an internal bus 21, a RAM 22, a communication unit 23, a nonvolatile memory 24, a media output unit 25, and an ID data acquisition unit 26. These components are configured to be able to transfer data to each other via the internal bus 21. The CPU 20 is arranged to read the followings memorized in the nonvolatile memory 24: namely, OS 30, instructions and constants of programs in which the relating means 16 and the initialization data generation means 17 are realized. These instructions and constants are memorized into the RAM 22 as necessary, thereby, in accordance with the instructions and constants, the computer perform reading or writing to execute software processing. The communication unit 23 is arranged to perform processing to transmit data to a network 32 via the internal bus 21 according to a request from the CPU 20, and contrarily to perform processing to report a process received from the network 32 to the CPU 20. The communication unit 23 also notifies the CPU 20 that its status has changed and that a processing request has occurred, by an interrupt signal. The CPU 20 is arranged to execute a series of software for generating the above initialization data and interrupt processing from the communication unit 23. The media output unit 25 is a device having the function of the media output means 18 in FIG. 1 and processes input/output to the initialization media 5. The ID data acquisition unit 26 is a device having the function of the ID data acquisition means in FIG. 1, and connects with the ID input device 2 to take input of data from the ID input device 2.

Figure 3:
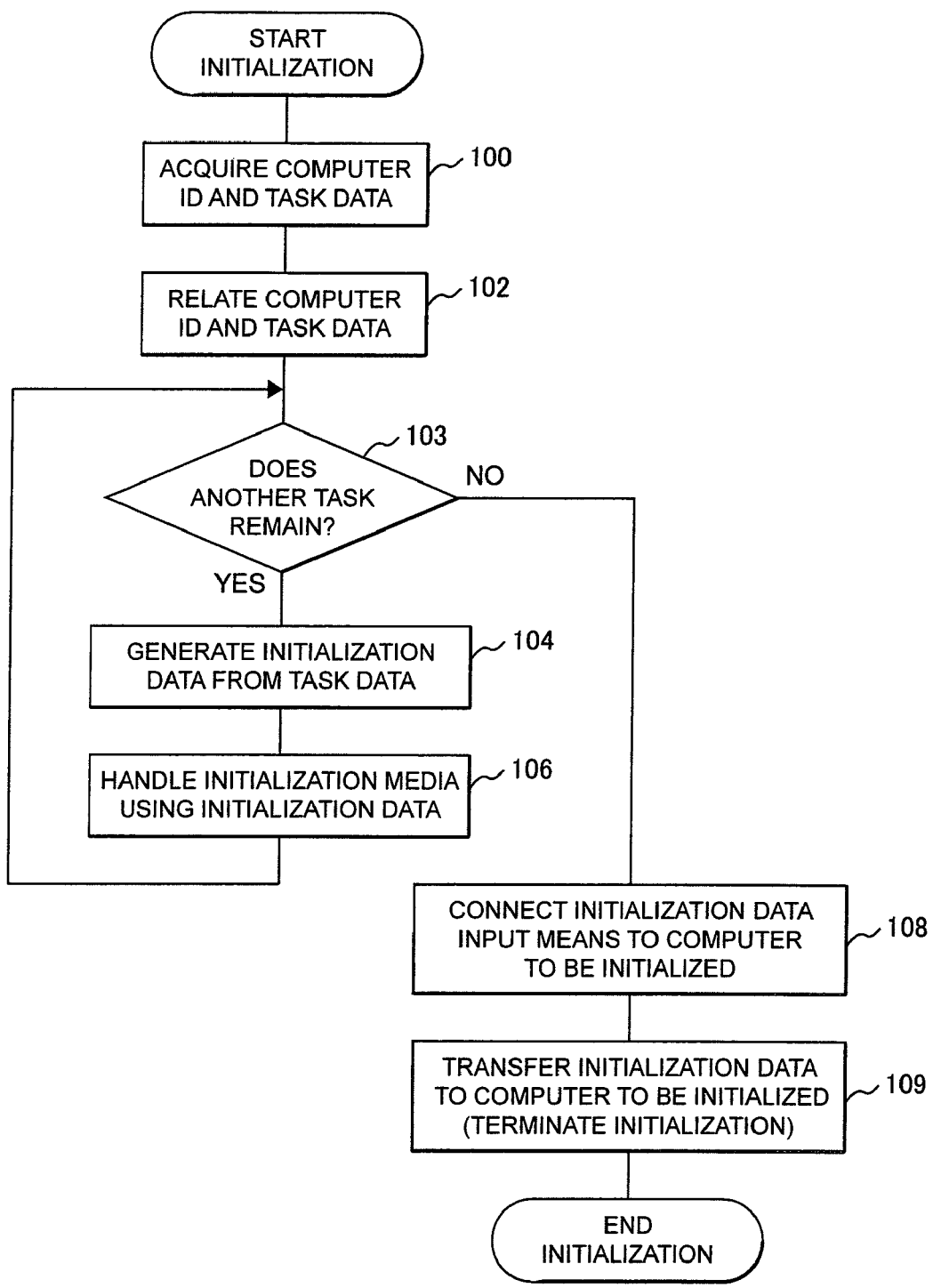
FIG. 3 is a flowchart illustrating an operation flow of the computer initialization system of the first embodiment.

A flowchart of processing operation of the computer initialization system of the present embodiment is shown in FIG. 3. Upon input of a instruction to start initialization, the ID input device 2 acquires a computer ID 8 from the computer 3 and task data 9 (FIG. 4) from the task sheet 4 to send these data to the ID data acquisition means 15 of the initialization data server 1 (step 100). The ID data acquisition means 15 transfers the received computer ID 8 and task data 9 to the relating means 16. The relating means 16 generates computer data (FIG. 5) in which these computer ID 8 and task data 9 are correlated, and registers this data into the computer DB 10 (step 102). Then, it is checked whether another task remains in the task data 9 related with the acquired computer ID 8 (step 103). If another task remains, the flow goes to step 104. If no task remains, the flow goes to step 108.

In the case that another task remains, the initialization data generation means 17 acquires an initialization data description of an initialization data ID related with each task ID of the task data 9 from the initialization DB 12 and generates initialization data (step 104). Here, the initialization data includes software for achieving functions required of the computer 3 to be initialized, the software, such as, for example, application software programs, basic software programs for running applications, and setup files. Then, the media output means 18 operates the initialization media 5, using the initialization data generated by the initialization data generation means 17, according to a task description acquired from the task DB 11 (step 106).

In the case that no task remains, the initialization media 5 where initialization data has been written, is act as the initialization input means 7 by joining together with the media input device 6, so that the initialization input means is connected to the computer 3 (step 108). After that, the computer 3 transfers the initialization data stored in the initialization input means 7 into its nonvolatile memory 86 and terminates the initialization process (step 109).

The computer initialization system of the present invention is configured to read the computer ID 8 and task data 9 from the ID input device 2, generate initialization data for realizing required functions of the computer 3, transfer the initialization data to the computer 3, and execute initialization.

Here, a concrete example of the procedure for generating initialization data according to the present embodiment is explained. An example of a task data 9 is shown in FIG. 4. As shown, the task data 9 comprises attributes such as task ordering 40, task ID 41, and initialization data ID 42. In FIG. 4, an example is presented where task data 9 including tuples 44 to 46 corresponding to task items is set. A tuple 44 in the example means that, in the "first" task order, "INIT-OS" designated as the task ID, i.e., writing of OS is processed and its initialization data is specified by ID "0x0012". Here, the initialization data ID 42 in the task data 9 corresponds to initialization data ID which has been stored into the initialization DB 12 beforehand. In the present specification, a code having "0x" as a prefix denotes a value represented in hexadecimal. Although character strings and numerical values are given by way of example as task ID and initialization data ID values, any recognizable codes may be used alternatively.

Meanwhile, a tuple 45 means that, in the "second" task order, "ERASE-APL" designated as the task ID, i.e., clearing the application area is processed. Since the ERASE-APL processing does not need initialization data, a special code "NULL" is described in the initialization data ID 42 field for the tuple 45. Likewise, a tuple 46 means that, in the "third" task order, "INIT-DRV" designated as the task ID, i.e., writing of a device driver is performed to initialization data "0x0014" specified as the initialization data ID.

An example of a computer data structure stored in the computer DB 10 is shown in FIG. 5. The relating means 16 relates the computer ID 8 and task data 9 acquired via the ID data acquisition means 15 and registers them in a form shown in FIG. 5 into the computer DB 10. This processing is executed in step 102 in the processing flowchart of FIG. 3.

Computer data in the present embodiment comprises attributes such as computer ID 50, task ordering 51, task ID 52, and initialization data ID 53. In FIG. 5, an example is presented where tuples 56 to 59 are recorded as computer data. The computer data ID 50 corresponds to the computer ID 8 acquired from the initialization-target computer 3. The task ordering 51, task ID 52, and initialization data ID 53 respectively correspond to the task ordering 40, task ID 41, and initialization data ID 42 acquired from the task data 9. In this way, task ordering, task description, and initialization data used for the task can be correlated per initialization-target computer by the computer data.

Here, the meaning of a tuple included in the computer data is explained, taking a tuple 56 as an example. The tuple 56 means that, to the computer 3 having the computer ID 50 of "0x0001", in the "first" of task order 51, the task of "INIT-OS" designated by the task ID 52 is processed with initialization data "0x0012" specified by the initialization data ID 53. A tuple 57 specifies the task to be executed in the "second" of task order 51 to the computer 3 having the computer ID 50. Thus, it is possible to specify the order of a series of tasks, which consists of a plurality of different tasks, to be executed to the computer 3.

An example of an initialization task data in the task DB 11 is shown in FIG. 6. In the task DB 11, initialization task data shown in FIG. 6 is stored beforehand. The initialization task data in the present embodiment comprises attributes such as task ID 60, intra-task ordering 61, and task description 62. In FIG. 6, an example is presented where tuples 65 to 69 are recorded as initialization task data for the respective attributes. The task data ID 60 of the initialization task data corresponds to the task ID 41 in the task data 9. The intra-task ordering 61 indicates the order in which each processing is executed in the task having the same task ID. The task description 62 specifies each processing to be executed by the initialization data server 1, mainly describing an operation to the initialization media 5.

Here, the meaning of a tuple included in the initialization task data is explained, taking a tuple 65 as an example. The tuple 65 means a processing set to be executed within the task "INIT-OS" designated as the task ID 60 and means that, in the "first" of intra-task order 61 of the task ID, "clearing the OS area" is executed as the task description 62. "Clearing the OS area" is, in particular, as follows: For example, when the initialization media 5 is a flash memory disk as per PC card specifications, this refers to setting the area where the OS is stored to a series of predetermined values (all bits 0 or all bits 1). On the other hand, when the initialization media 5 is an optical media such as CD-R or CD-RW, this may include formatting.

Also a tuple 66 means that the task ID 60 is "INIT-OS" which is the same as the tuple 65, and it is specified that the intra-task order 61 is "second" and the task description 62 is "writing data into the OS area". The data mentioned here refers to data specified by the initialization data ID 42 included in the task data 9. In this way, by using the initialization task data stored in the task DB 11, processing details on a task designated by task ID 60 can be set flexibly.

An example of an initialization data stored in the initialization DB 12 is shown in FIG. 7. Contents of initialization data in the initialization DB 12 are set and stored in advance into the initialization DB 12 before the use of the initialization data server 1. The initialization data in the present embodiment comprises attributes such as initialization data ID 70, identifier 71, and initialization data description 72. In FIG. 7, an example is presented where tuples 75 to 79 are recorded as initialization data for the attributes. The initialization data ID 70 corresponds to the initialization data ID 42 in the task data 9. The identifier 71 is a unique code related with each of a plurality of initialization data descriptions belonging to an initialization data ID 70. In the present embodiment, serial numbers as the identifier are assigned to the initialization data descriptions in the initialization DB 12. The initialization data descriptions 72 are data that is practically used for initialization, it can store object codes and setup files which are data entities, therein. Such description may be data or a character string indicating a position where a data entity is stored. In the present embodiment, character strings indicating positions where data entities are stored on the initialization data server 1, are stored in the initialization data description 72. It is preferable to store data entities in a file system (not shown) which is, for example, built in the nonvolatile memory 24.

Here, the meaning of a tuple included in the initialization data is explained, taking a tuple 75 as an example. The tuple 75 specifies that initialization data with the initialization data ID 70 of "0x0012" and the identifier 71 of "1" is "/data/kernel-1" specified by the initialization data description 72. Initialization data having "0x0012" as the initialization ID 70 consists of "/data/kernel-1" and "/data/kernel-1-conf", as seen from the tuple 75 and tuple 76. Likewise, initialization data having 0x0014 as the initialization data ID 70 consists of "/data/etc/drv-1", "/data/etc/drv-2", and "/data/etc/drv-3".

In this way, by using the initialization DB 12, initialization data entities can be specified flexibly, related with initialization data ID.

The task data 9, computer DB 10, task DB 11, and initialization DB 12 described hereinbefore are all normalized so that they can be implemented as relational databases. If these databases are constructed so that they are consistent even if a tuple is inserted, updated, or deleted, the attributes to be candidate keys are not limited to the above structure examples. For example, the identifiers 71 in the initialization DB 12 may be configured to be main keys in combination with an initialization data ID 70. In particular, it is only required that the identifiers be assigned not to be duplicated within the same initialization data ID 70.

Provision of all of the computer DB 10, task DB 11, and initialization DB 12 is not always necessary. For example, if there is only a simple task description such as "writing to the initialization media" and data that is used for initialization is few, these databases may be combined and an computer initialization task database may be prepared which is constructed by extracting only necessary attributes such as computer ID, task description, and initialization data description.

Next, processing in the steps 104 and 106 in FIG. 3, i.e., processing that is executed by the initialization data generation means 17 and the media output means 18, is explained. First, initialization data generation means 17 selects a tuple related with the computer ID 8 of the computer 3 from the computer DB 10. According to the appropriate task ordering 51 within the selected tuple, it selects the related task ID 52 and initialization data ID 53. It acquires a detailed task description related with the task ID 52 from the task DB 11 and an initialization data description related with the initialization data ID 53 from the initialization DB 12.

Then, the initialization data generation means 17 operates the initialization media 5 via the media output unit 25, based on the initialization task data acquired from the task DB 11 according to the task ordering 51. Next, the initialization data generation means 17 transfers a file set, in which files are collected and stored in a position within a file system designated by the initialization data description 72 related with the initialization data ID 53 acquired from the initialization DB 12, to the computer 3, by using the initialization data input means 7.

Figure 8A:
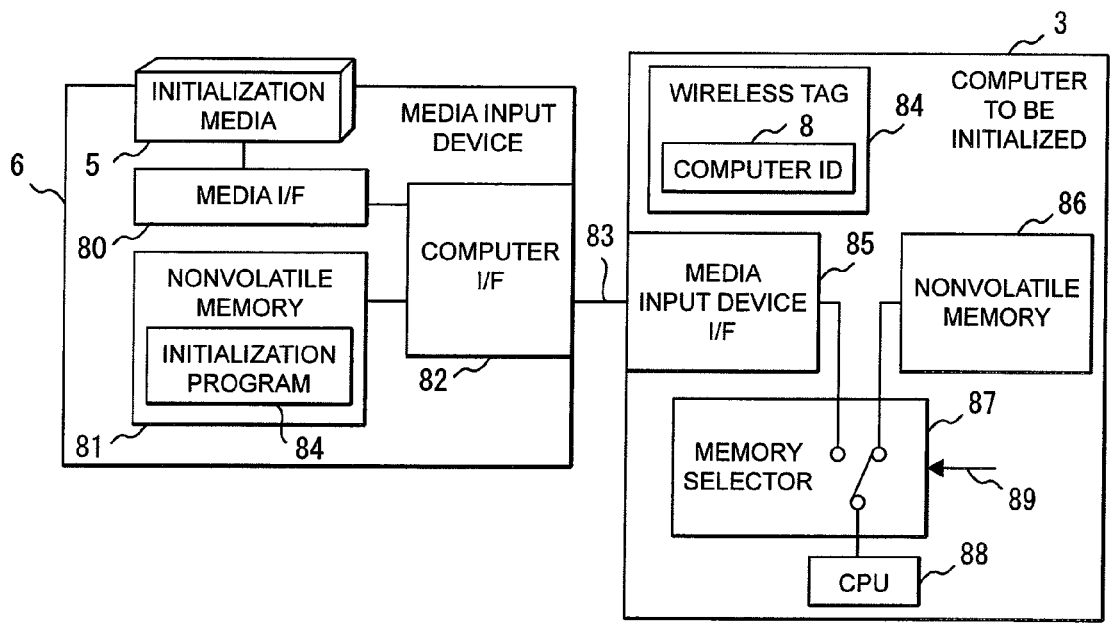
FIG. 8A shows exemplary structures of a media input device and a computer to be initialized in the first embodiment.
Figure 8B:
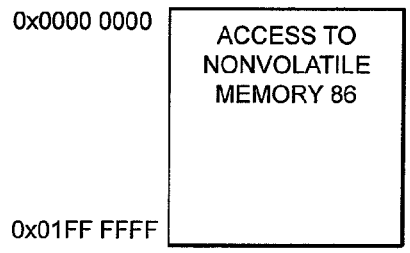
FIG. 8B shows an example of address mapping in a computer to be initialized.
Figure 8B:
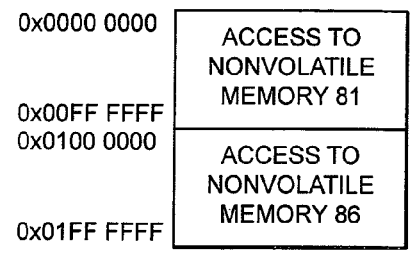

Here, using FIGS. 8A and 8B, a concrete embodiment of transferring initialization data to the computer 3 by using the initialization data input means 7, is explained in detail. FIG.8A shows detailed configurations of the media input device 6 and the computer 3 and an example of their connection. In the computer 3 to be initialized, for example, when it is an embedded computer, memories and input/output interfaces which are not used in usual operation are, commonly, not implemented. Therefore, a configuration example of a computer configured with minimum necessary elements is shown in FIG.8A. However, it is needless to say that application of the present invention is not limited to embedded computers and the present invention can be applied to general computers.

As shown in FIG.8A, the media input device 6 comprises a media interface (hereinafter, interface is abbreviated to I/F) 80 for connection with the initialization media 5, a nonvolatile memory 81, and a computer I/F 82 for connection with the computer 3. According to request from the computer 3, the computer I/F 82 transfers programs and data stored in the nonvolatile memory 81 and the initialization media 5 to the computer. The media I/F 80 provides an electrical and logical interface specific for the initialization media 5 and transfers data between the computer I/F 82 and the initialization media 5. An initialization program 84 is stored in the nonvolatile memory 81.

The computer 3 comprises a wireless tag 84 in which the computer ID 8 is stored, a media input device I/F 85 for connection with the media input device 6, a nonvolatile memory 86, a memory selector 87, and a CPU 88. The media input device I/F 85 of the computer 3 is connected to the computer I/F 82 of the media input device 6 via a transmission path 83.

The memory selector 87 is configured to switch an object where the CPU 88 gets access, between the nonvolatile memory 86 and the nonvolatile memory 81 of the media input device 6, according to a memory select signal 89 and an address from the CPU 88. When the memory selector 87 selects the media input device I/F 85, the CPU 88 is arranged to read the initialization program 84 from the nonvolatile memory 81 via the media input device I/F 85. The CPU 88 is configured to execute the read initialization program 84, read the initialization data description 72 stored in the initialization media 5, make a switchover of the memory selector 87 to transfer the initialization data to its local nonvolatile memory 86.

FIG. 8B shows address maps viewed from the CPU 88 when the memory select signal 89 is setting for usual operation and when it is setting for initialization. The left part of FIG. 8B shows the address map when the memory select signal 89 is setting for usual operation, wherein the CPU 88 gets access to the nonvolatile memory 86. The right part of FIG. 8B shows the address map when the memory select signal 89 is setting for initialization, wherein the CPU 88 gets access to the nonvolatile memory 81 and the nonvolatile memory 86 both ways according to an address.

The memory select signal 89 may be set by hardware such as a mode select switch. The memory select signal 89 may be output when the media input device I/F 85 detects a connection of the media input device 6.

Here, how the computer 3 in FIG. 8A acquires initialization data from the initialization media 5 is explained concretely. In general, the nonvolatile memory 86 of the computer 3 is initialized at the stage when it is shipped from a parts manufacturer. That is, the parts manufacturer of the computer 3 writes programs into the nonvolatile memory 86 by a ROM writer, before the parts manufacturer ships the nonvolatile memory 86 after writing necessary programs into the nonvolatile memory 86 and implementing it into the computer. In the case where the manufacturer writes programs into the nonvolatile memory 86, it is necessary to fix what programs are implement into each computer at the stage of shipment. Therefore, such writing operation becomes complex if different programs are implement into each computer, respectively.

By the way, a nonvolatile memory called a BIOS ROM is used in a personal computer (PC). In such case, it is possible to preload into the BIOS ROM a program for reading contents of an external storage device, e.g., CD-ROM and transferring therefrom necessary programs and data into an internal nonvolatile memory and a hard disk device. In the case of embedded computers, the BIOS ROM is, commonly, not implemented to avoid a cost increase by the BIOS ROM. In this case, the nonvolatile memory 86 is empty in its initial state when the computer is shipped. Consequently, the CPU 88 cannot operate with access to the nonvolatile memory 86, because no programs are loaded into the memory. Therefore, conventionally, it has been necessary to write programs into the nonvolatile memory 86 directly, using, e.g., an ICE (In Circuit Emulator) device. However, this not only needs a specialized device such as the ICE, but also requires a long working time and skilled operators, which is not desirable in production efficiency.

Therefore, the present embodiment is characterized by initializing the nonvolatile memory 86 of the computer 3 to desired contents in a convenient and flexible manner without using the ICE device. Specifically, upon a switchover of the memory select signal 89 to setting for initialization, the CPU 88 of the computer 3 is set to access a predetermined address (address 0x0000 0000 in the example of FIG. 8B and read instructions after power is connected and reset is released. This address of 0x0000 0000 is on the nonvolatile memory 81 of the media input device 6 and the initialization program 84 is stored in the same address. Then, the CPU 88 reads and executes the initialization program 84. Description in the initialization program 84 is an instruction to transfer initialization data, which is stored in the initialization media 5, to the nonvolatile memory 86. Thereby, the CPU 88 can acquire initialization data from the initialization media 5 and transfer this data to the nonvolatile memory 86, even if the nonvolatile memory 86 is empty.

After thus transferring only necessary data from the initialization media 5 to the nonvolatile memory 86, the media input device 6 is disconnected from the computer 3. At this point of time, necessary programs have been transferred and written to the nonvolatile memory 86 of the computer 3. Hence, the computer 3 to be initialized can perform intended operation even without the media input device 6.

Here, Described is an example of a method of using the computer initialization system of the present embodiment. In the production line of the computer 3 to be initialized, an operator acquires the computer ID 8 and task data 9 by aiming the ID input device 2 such as, e.g., an RFID reader/writer at the computer 3 and the task sheet 4 for the computer. The ID input device 2 transmits the acquired computer ID 8 and task data 9 to the initialization data server 1. The initialization data server 1 generates initialization data related with the computer ID 8 and task data 9, and stores the initialization data into the initialization media 5 such as, for example, a PC card type flash memory card connected to the initialization data server 1. Then, the operator removes the initialization media 5 from the initialization data server 1 and inserts the initialization media 5 into the media input device 6. The operator connects the media input device 6 to the computer 3 in which the memory select signal 89 has been set for initialization. After that, the operator only turns on the power to the computer 3, then the computer 3 is initialized.

Hence, according to the present embodiment, it is possible to easily set up desired programs from the initialization media 5 into the nonvolatile memory 86 of the computer 3. Programs appropriate for the type and functions of the computer 3 can be set up in a machine specific manner and, thus, various requirements can be satisfied flexibly.

Accordingly, there is no need to write programs into the nonvolatile memory 86 before installing the nonvolatile memory in the computer 3. There is no need to writing programs into the nonvolatile memory 86 of the computer 3 by using a specialized device such as the ICE. Consequently, for embedded computers which need different programs to be installed according to their applications, it is possible to produce in advance a large quantity of computer devices having the same hardware configuration and install implementation programs after the applications of the devices are determined, and this can improve production efficiency.

The media input device 6 and the initialization media 5 must be connected to the computer 3 only when the computer is initialized. Therefore, there is no need for the computer 3 to install the nonvolatile memory 81 where the initialization program 84 has been loaded. Accordingly, the computer 3 to be initialized can be configured with a minimum number of parts and its implementation is feasible by only adding the memory selector 87 and the media input device I/F 85 to an embedded computer which has a wide spectrum of applications currently.

In the present embodiment, as data transmission means between the ID input device 2 and the computer 3 or the task sheet 4, any transmission means may be used, provided that data such as computer ID 8 and task data 9 can be transferred therebetween. For example, bar code, two-dimensional bar code, wireless tags for active or passive radio transmission/reception using 13.56 MHz/UHF/ISM (Industry Science Medical; frequencies around a center frequency of 2.4 GHz) bands, infrared light, contact IC cards, etc. can be applied.

Communication means between the ID input device 2 and the initialization data server 1 may be provided by applying wired or wireless network technology or using a serial transmission scheme called RS-232C.

Further, for the initialization media 5, for example, a PC card type nonvolatile memory card, a Compact Flash™ type nonvolatile memory card, CD-ROM, DVD-ROM, a nonvolatile memory connecting with USB can be used. As examples of a communication path that is used for the initialization media 5, RS-232C, a communication scheme prescribed in IEEE 802.3, a wireless communication scheme prescribed in IEEE 802.11, etc. can be applied.

For a nonvolatile memory such as the nonvolatile memory 24 of the initialization data server 1, an electrically erasable and programmable EEPROM, a flash memory, a hard disk device, a magneto optical media such as CD-ROM, etc. can be applied.

Further, for network technology that is used as the network 32 in FIG. 2, Ethernet™ which is a wired network technology, RS485, a serial transmission technology using optical fibers and other media, or a parallel transmission technology such as SCSI and PCI bus, etc. can be applied; however, applicable network technology is not limited to these.

Second Embodiment

Figure 9:
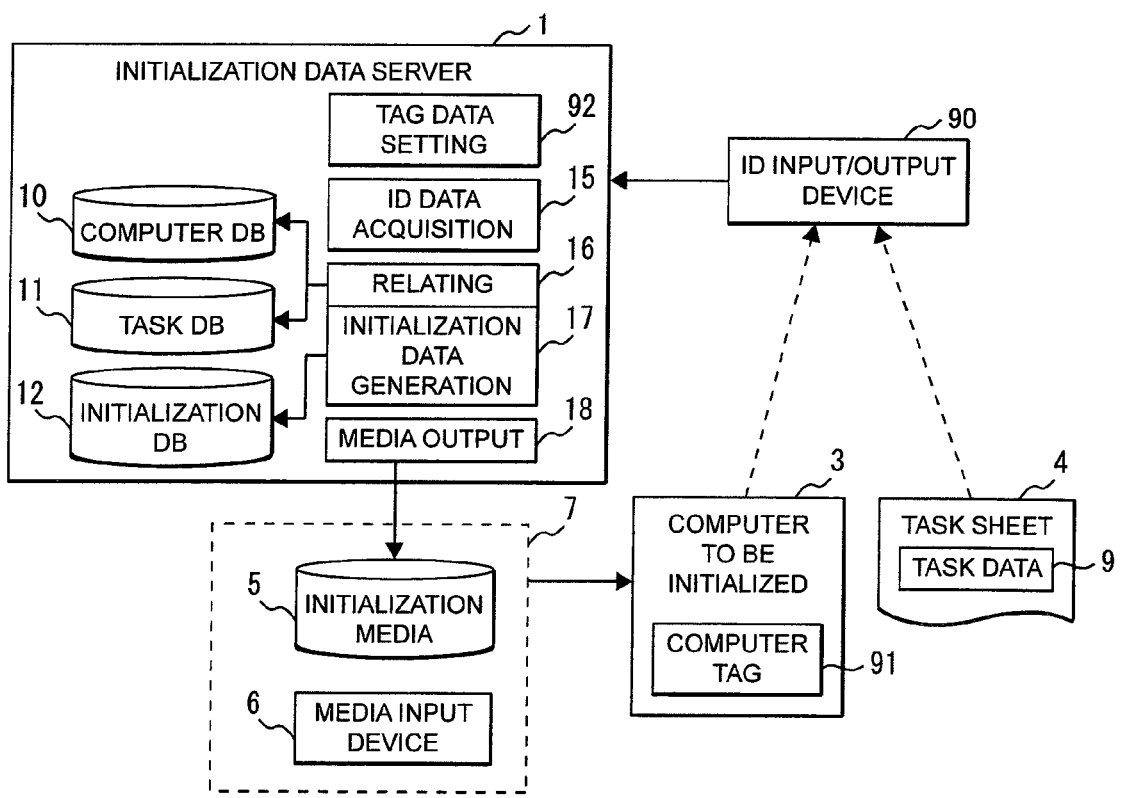
FIG. 9 is a block diagram representing a schematic framework of a computer initialization system of a second embodiment of the present invention.

A block diagram representing a schematic framework of a computer initialization system of a second embodiment of the present invention is shown in FIG. 9. Differences of the present second embodiment from the first embodiment are change of the ID input device 2 in the first embodiment to an ID input/output device 90, change of the wireless tag in which the computer ID 8 is stored to a readable/writable computer tag 91, and addition of a tag data setting means 92 to the initialization data server 1. Therefore, functions and elements and the like corresponding to those in the first embodiment 1 are assigned the same reference numbers and their description is not repeated.

A feature of the present embodiment is that data can be set up from the initialization data server 1 into the computer tag 91 installed on the computer 3. As the data to be set up from the initialization data server 1, mentioned as examples is configuration information for OS and applications and information required to operate the computer 3, such as, e.g., IP address and parameters for RS-232C connection.

The computer tag 91 is a tag having a memory for preserving data. As the computer tag 91, a wireless tag using RFID or IEEE 802.11 standard or an IC card having contacts is preferable. Data of the computer ID 8 in the first embodiment is stored in the computer tag 91.

The ID input/output device 90 has a function to read task data 9 and a function of reading/writing from/to a computer tag 91. The ID input/output device 90 connects to the initialization data server 1, sends task data 9 and data from the computer tag 91 to the ID data acquisition means 15, and sets up data from the tag data setting means 92 into the computer tag 91.

The tag data setting means 92 of the initialization data server 1 has functions to generate computer tag data, based on data stored in the computer DB 10, task DB 11, and initialization DB 12, and send the computer tag data to the ID input/output device 90. The tag data setting means 92 is realized by a program and this program is installed in the nonvolatile memory 24 in FIG. 2 as a tag data setting program.

Figure 10:
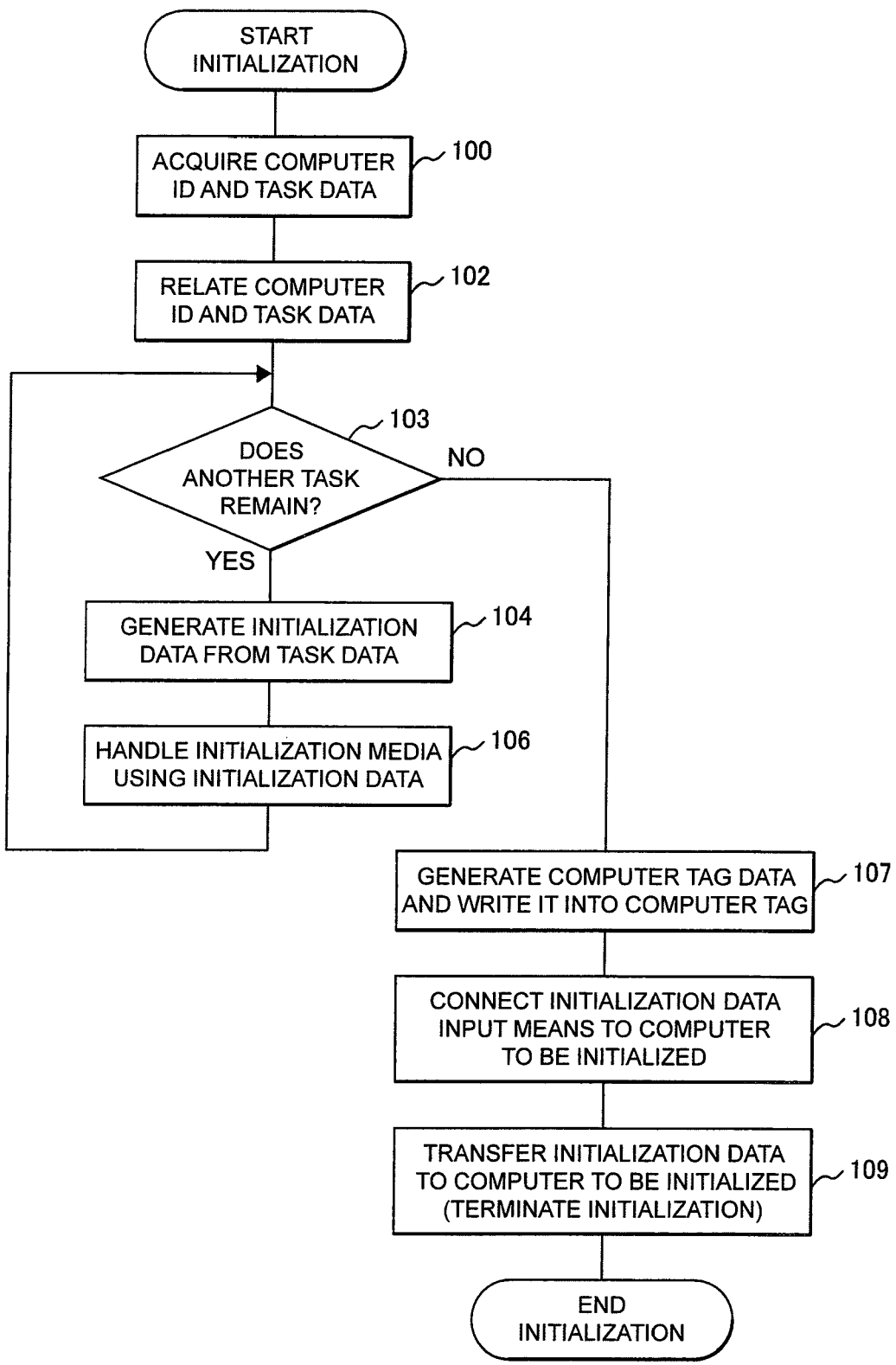
FIG. 10 is a flowchart illustrating an operation flow of the computer initialization system of the second embodiment.

An operation flow of the computer initialization system of the present embodiment is illustrated in FIG. 10. Difference of this operation flow in this figure from the operation flow of FIG. 3 is addition of processing of step 107 and other details are the same as processing in FIG. 3. At step 107, the tag data setting means 92 in the initialization data server 1 generates computer tag data from the computer DB 10, task DB 11, and initialization DB 12. And the computer tag data is written into the computer tag 91 via the ID input/output device 90. The computer tag data is data related to initialization data generated by processing from step 100 to step 106 and comprises setting values related to OS, applications, and device drivers included in the initialization data. In particular, parameters (IP address, RS-232C communication parameters, etc.) for connection with the computer 3, TCP port numbers for applications for setup, installation software version information, manufacturing date, a manufacturing serial number, etc. are mentioned as examples.

According to the present embodiment, setup data relevant to the computer 3 to be initialized can be held in the computer tag 91. In consequence, when the computer 3 is put to maintenance, necessary information can be acquired without accessing the computer DB 10, task DB 11, and initialization data 12, and maintainability is improved.

Third Embodiment

Figure 11:
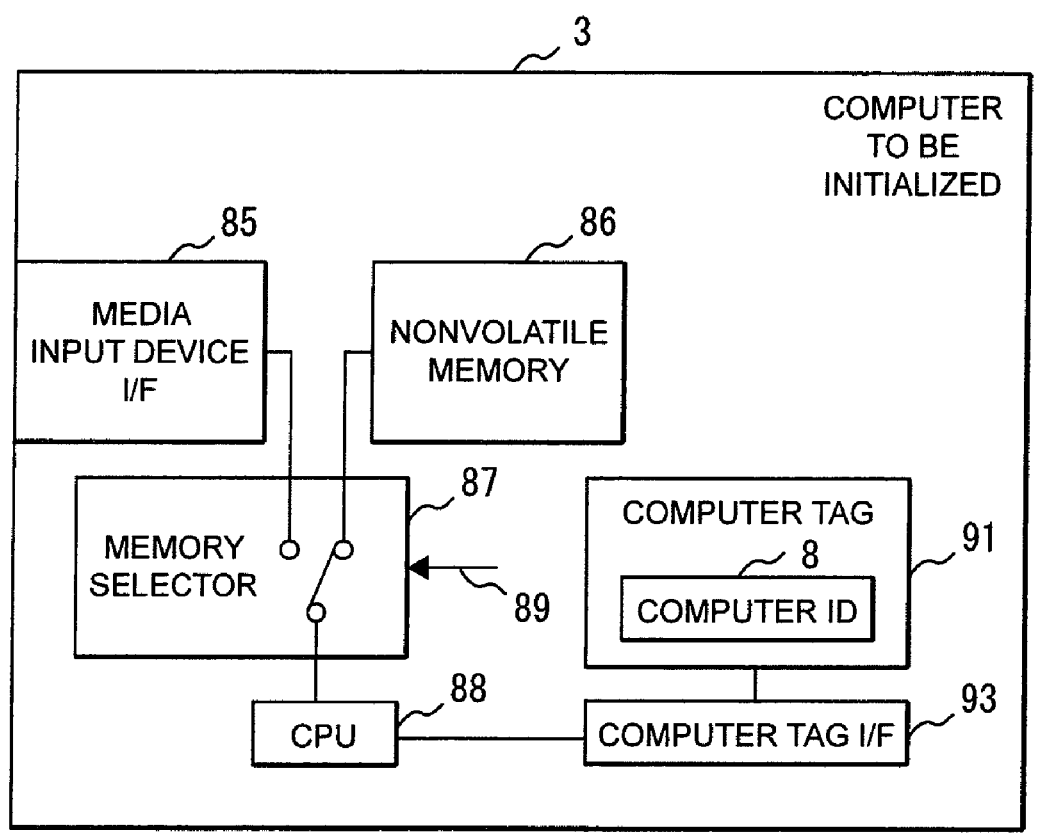
FIG. 11 is a diagram showing an example of a configuration of a computer to be initialized in a computer initialization system of a third embodiment of the present invention.

FIG. 11 shows a block diagram representing a schematic framework of a computer initialization system of a third embodiment of the present invention. Difference of the present embodiment from the computer 3 in the first and second embodiments is addition of a computer tag I/F 93 between the computer tag 91 and the CPU 88. Since other components are the same as in the first and second embodiments, they are assigned the same reference numbers and their description is not repeated.

Although the computer tag 91 in this embodiment is installed on the computer 3 in FIG. 11, alternately a wireless tag may be used as in the first embodiment. The computer tag I/F 93 is an interface device for the CPU 88 to acquire data stored in the computer tag 91. For example, the CPU 88 can perform processing for authentication of the computer 3 by using the computer ID of the computer 3 described in the computer tag 91. For the authentication of the computer 3, the use of cryptographic technology is preferable.

For example, in a case where a public key cryptosystem is used, a private key corresponding to the computer ID 8 and a public key are prepared. The private key is stored only in the computer tag 91 and the public key is disclosed in a system where a computer device communicating with the computer 3 can know the public key, for example, a PKI (Public Key Infrastructure) system.

The peer obtains the computer ID 8 from the computer 3 before starting communication and also obtains the pubic key corresponding to the computer ID 8 from a certificate authority. If a document encrypted by the peer using the pubic key can be decrypted using the corresponding private key by the computer to be initialized 3, it is possible to authenticate that the computer ID 8 of the computer 3 is valid.

When the computer tag 91 communicates with its outside by radio technology, known is a technology that forms an antenna for radio communication on the printed circuit board of the tag. The tag communicates with the computer tag I/F 93 via the antenna formed on the printed circuit board, so that the CPU 88 can refer to data in the computer tag 91.

According to the present embodiment, in addition to advantages of the first and second embodiments, an application running on the computer 3 can make use of the computer ID 8 for purposes such as, for example, authentication and unique identification.

Fourth Embodiment

Figure 12:
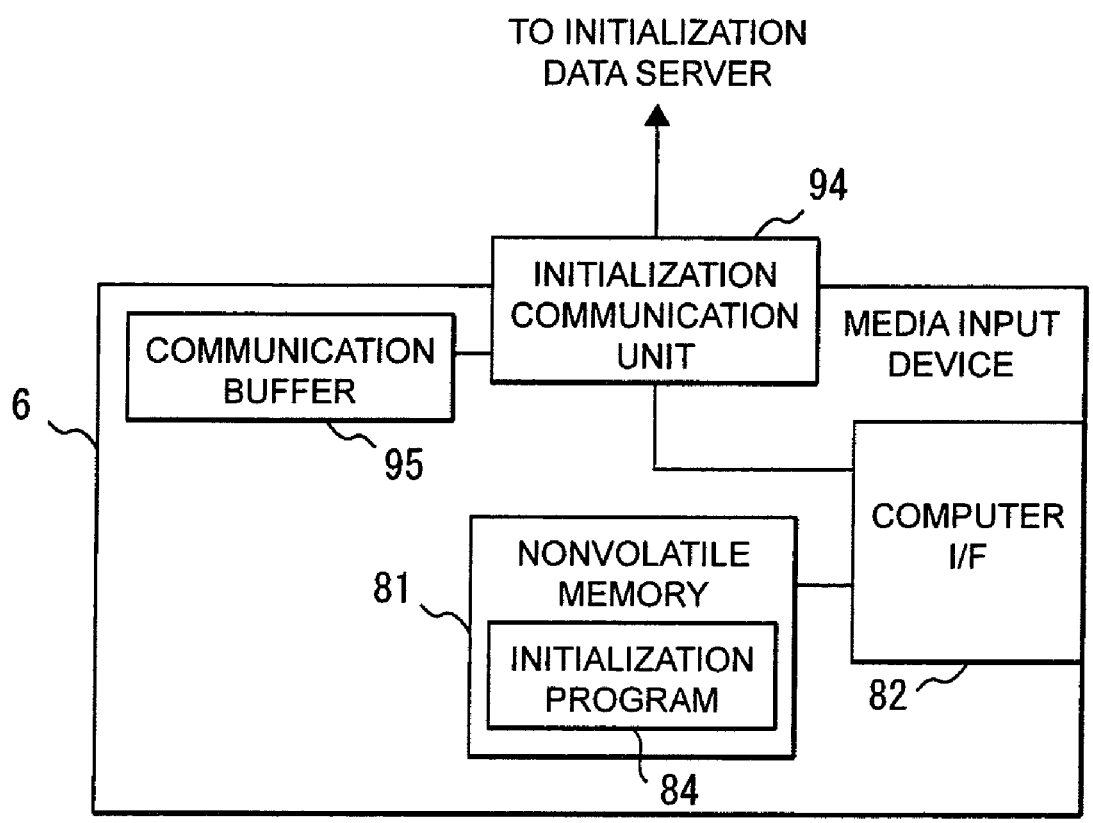
FIG. 12 is a diagram showing an example of a configuration of a media input device in a computer initialization system of a fourth embodiment of the present invention.

FIG. 12 shows a block diagram of a media input device that is used in a computer initialization system of a fourth embodiment of the present invention. Difference of the present embodiment from the media input device 6 in the first and second embodiments lies in that media input device 6 is equipped with an initialization communication unit 94 and a communication buffer 95 instead of the initialization media 5 and the media I/F 80. Since other components are the same as in the first and second embodiments, they are assigned the same reference numbers and their description is not repeated.

In the present embodiment, the initialization communication unit 94 communicates with the communication unit 23 and the media output unit 25 of the initialization data server 1 of FIG. 2. Initialization data generated by the initialization data server 1 is stored into the communication buffer 95. As the communication buffer 95, a volatile memory such as SRAM or DRAM or a nonvolatile memory such as a flash memory or EEPROM can be used. Upon receiving a request for initialization data from the computer 3, the computer I/F 82 acquires initialization data from the communication buffer 95 via the initialization communication unit 94.

By configuring the media input device 6 as in the present embodiment, only required is of a communication path between the initialization data server 1 and the media input device 6 is only required. If connections are established in advance between the initialization data server 1 and the media input device 6 and between the media input device 6 and the computer 3, it is possible to automate the procedure comprising: acquiring the computer ID 8 from the computer 3, generating initialization data related with the computer ID, and finally transferring the initialization data to the computer. Thereby productivity can be improved.

What is claimed is:

1. A computer initialization system comprising:
   an initialization data generator including a task database in which task descriptions for initializing a computer are specified related with task IDs, and an initialization database in which initialization data descriptions for initializing said computer are stored related with initialization data IDs;
   wherein said initialization data generator comprises: a data acquisition means which takes input of a computer ID for identifying said computer and task data for initialization of said computer, wherein said task data specifies said task IDs for identifying said task descriptions, task ordering for initialization task, and said initialization data IDs for identifying initialization data of initialization-software to be installed into said computer; and
   an initialization data generation means which reads said task descriptions and said initialization data descriptions from said task database and said initialization database according to said task ordering, by using said task IDs, said task ordering and said initialization data IDs, and generates said initialization data for initializing said computer according to said data descriptions.

2. The computer initialization system according to claim 1, wherein said initialization data generator further comprises an initialization data output means for transferring said initialization data generated by said initialization data generation means to said computer to be initialized.

3. The computer initialization system according to claim 1, wherein said initialization data generator further comprises a computer database for storing said computer ID and said task data related with each other, and a relating means for relates said computer ID and said task data acquired by said data acquisition means and stores them into said computer database.

4. The computer initialization system according to claim 2, wherein said initialization data output means is configured to outputs said initialization data to an initialization media which is connectable to said computer to be initialized.

5. The computer initialization system according to claim 1, further comprising:
   a wireless tag in which said computer ID and said task data are described; and
   an input device which reads said computer ID and said task data from said wireless tag to transmit them to said data acquisition means.

6. A computer initialization system comprising:
   an ID input device for reading a computer ID for identifying a computer to be initialized and a task data for initialization of said computer, wherein said task data specifies task IDs for identifying initialization-task descriptions, task ordering for initialization task, and initialization data IDs for identifying initialization data of initialization-software to be installed into said computer;
   a task database for specifying task descriptions for initializing said computer related with said task IDs;
   an initialization database for storing initialization data descriptions for initializing said computer related with said initialization data IDs;
   an initialization data generator which is connected to said input device via a communication means, reads said task descriptions and said initialization data descriptions from said task database and said initialization database according to said task ordering related with said task data, by using said computer ID and said task data which are input from said input device, and generates said initialization data for initializing said computer according to said data descriptions; and
   a media input device including an initialization media for connecting to said initialization data generator via a communication means to store said initialization data transferred from said initialization data generator, a memory for containing an initialization program for said computer, and a computer interface that, by request from said computer to be initialized, transfers said initialization program for reading said initialization data from said initialization media to said computer.

7. The computer initialization system according to claim 6, wherein said initialization data generator comprises a data acquisition means for taking in said computer ID and said task data from said ID input device, and a relating means for relating said computer ID and said task data acquired by said target data acquisition means to store them into a computer database.

8. The computer initialization system according to claim 7, wherein said initialization data generator further comprises a tag data setting means for setting computer tag data, based on the contents of said computer database, said task database, and said initialization database, wherein said computer tag data includes at least one of the following: initialization software-parameters included in said initialization data, TCP port numbers for applications for setup, installation software version information, manufacturing date, and a manufacturing serial number; and
wherein said initialization data generator is configured to transfer and write said computer tag data to a computer tag provided in or attached to said computer.

9. The computer initialization system according to claim 6, wherein said computer to be initialized comprises a media input device interface connected to the computer interface of said media input device via a communication means, and a selector means for allowing an arithmetic processing means of said computer to be initialized to get access to said media input device, wherein said arithmetic processing means is configured to write initialization data stored in said initialization media into a program memory of said computer by reading and executing said initialization program residing in said media input device via said media input device interface and said computer interface.

* * * * *